(12) United States Patent
Muise

(10) Patent No.: US 9,347,494 B2
(45) Date of Patent: May 24, 2016

(54) GUIDING ELEMENT FOR ACTUATOR

(71) Applicant: Boss Tool Corporation, Dover, NH (US)

(72) Inventor: Steven P. Muise, Dover, NH (US)

(73) Assignee: Boss Tool Corporation, Dover, NH (US)

( * ) Notice: Subject to any disclaimer, the term of this patent is extended or adjusted under 35 U.S.C. 154(b) by 0 days.

(21) Appl. No.: 14/799,041

(22) Filed: Jul. 14, 2015

(65) Prior Publication Data

US 2016/0017927 A1    Jan. 21, 2016

Related U.S. Application Data

(60) Provisional application No. 62/024,606, filed on Jul. 15, 2014.

(51) Int. Cl.
    *F16C 41/00*    (2006.01)
    *F16C 17/12*    (2006.01)
    *F16C 29/02*    (2006.01)

(52) U.S. Cl.
    CPC ............... *F16C 41/005* (2013.01); *F16C 17/12* (2013.01); *F16C 29/02* (2013.01); *F16C 2235/00* (2013.01)

(58) Field of Classification Search
    CPC ........ F16C 41/005; F16C 17/12; F16C 29/02; F16C 2235/00
    See application file for complete search history.

(56) References Cited

U.S. PATENT DOCUMENTS

| | | | |
|---|---|---|---|
| 2,591,902 A | 4/1952 | Yohpe | |
| 3,128,592 A * | 4/1964 | Calvert | ..................... D01H 1/36 248/415 |
| 4,193,167 A | 3/1980 | Orlowski et al. | |
| 4,263,695 A | 4/1981 | Duncan et al. | |
| 4,993,598 A | 2/1991 | Groninger | |
| 5,033,869 A * | 7/1991 | Kingston | ............... F16C 29/008 384/13 |
| 5,758,965 A | 6/1998 | Gambrill et al. | |
| 5,779,359 A | 7/1998 | Gambrill et al. | |
| 6,073,505 A | 6/2000 | Yuda | |
| 6,089,758 A | 7/2000 | Ward | |
| 6,623,169 B2 | 9/2003 | Ward | |
| 7,070,329 B2 * | 7/2006 | Wang | ...................... F16C 33/04 384/29 |
| 7,415,816 B2 | 8/2008 | Bernhard | |
| 2005/0045537 A1 | 3/2005 | Imanse et al. | |
| 2010/0098360 A1 | 4/2010 | Schmitjes et al. | |
| 2010/0290726 A1 | 11/2010 | Schlipf et al. | |
| 2011/0253182 A1 | 10/2011 | Isenberg et al. | |

* cited by examiner

*Primary Examiner* — Thomas R. Hannon
(74) *Attorney, Agent, or Firm* — Schmeiser, Olsen & Watts LLP

(57) ABSTRACT

Provided is a washdown bearing for an actuator, comprising: a housing having an annular wall surface extending in a longitudinal direction; a bore extending through an interior of the housing in the longitudinal direction; a plurality of irrigation channels in the housing extending through the annular wall surface of the housing to the bore that provide a fluid path between the wall surface to the bore; first and second cylindrical plane bearings positioned at ends of the housing, each having a low-friction surface permitting the absence of an externally applied lubricant; and an opening extending along a longitudinal axis through the plane bearings and the housing for receiving a rotatable or translatable shaft element.

10 Claims, 9 Drawing Sheets

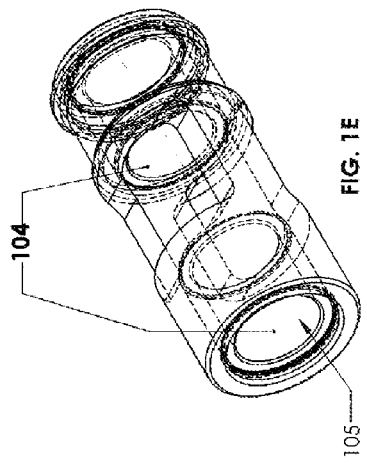
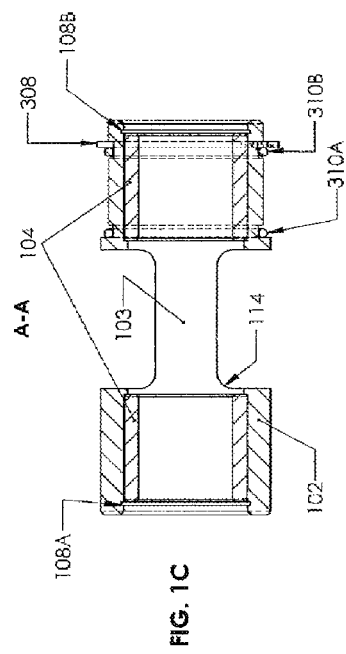
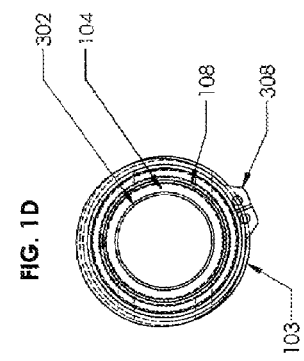
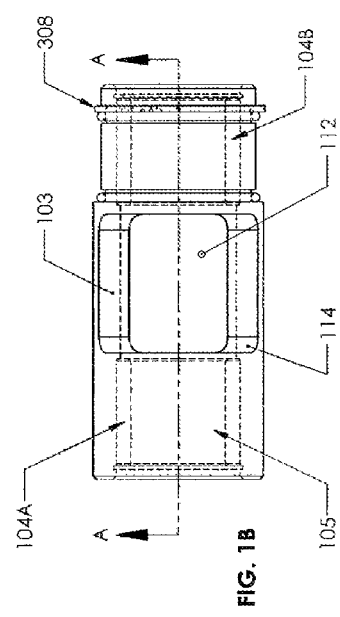

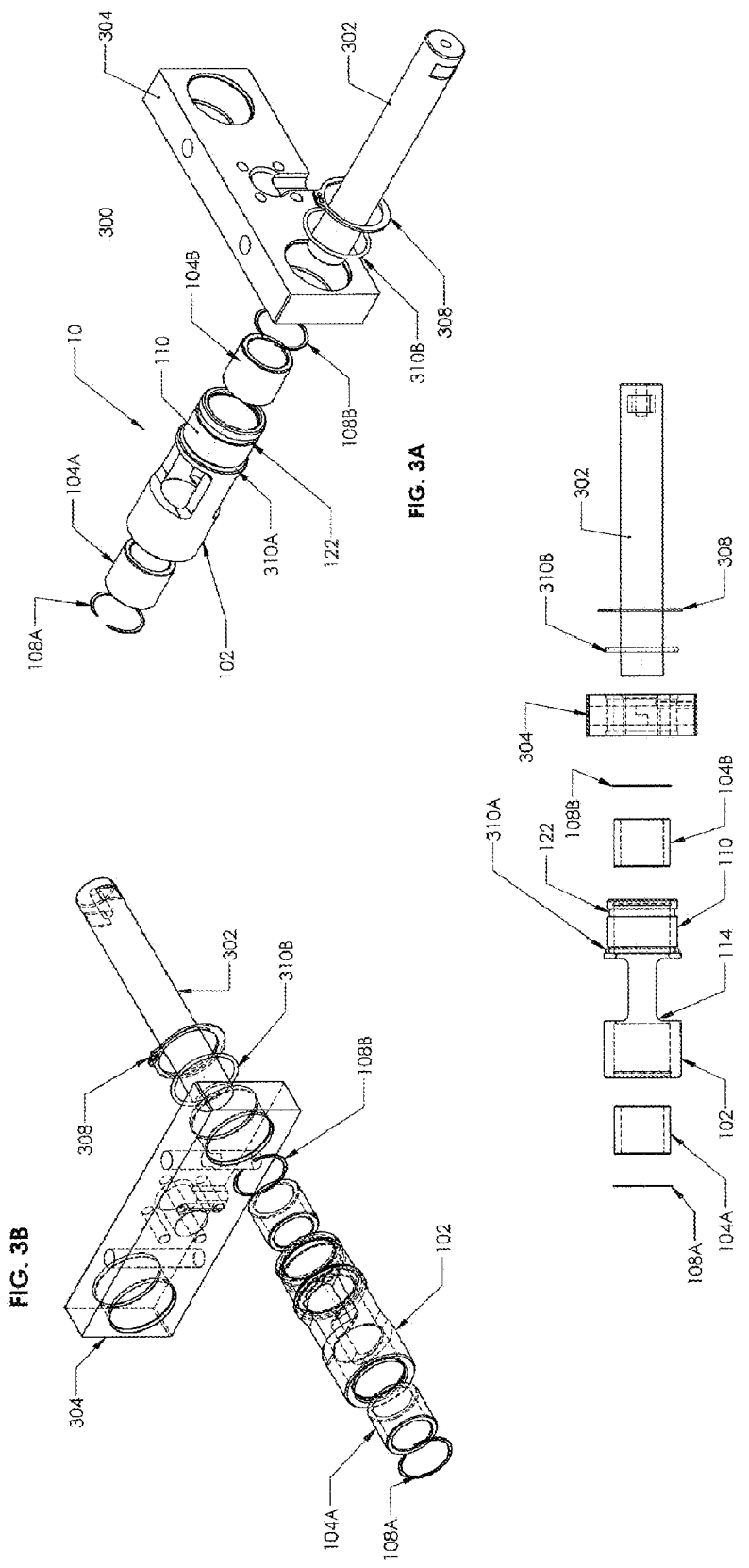

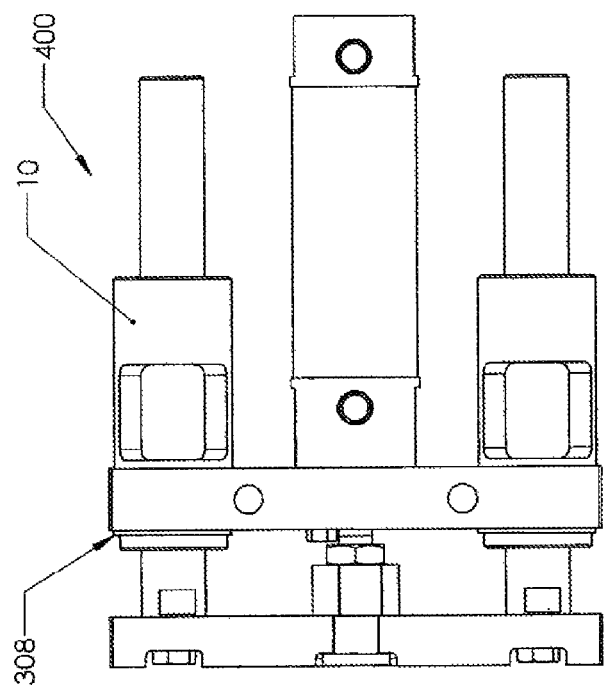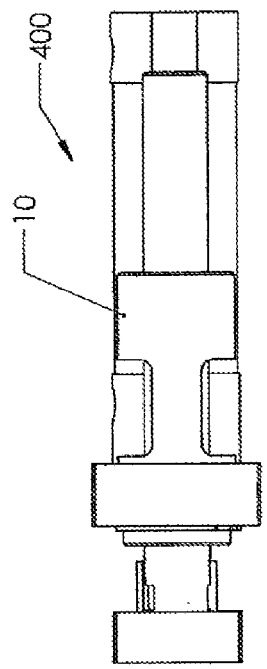
FIG. 4B
FIG. 4C

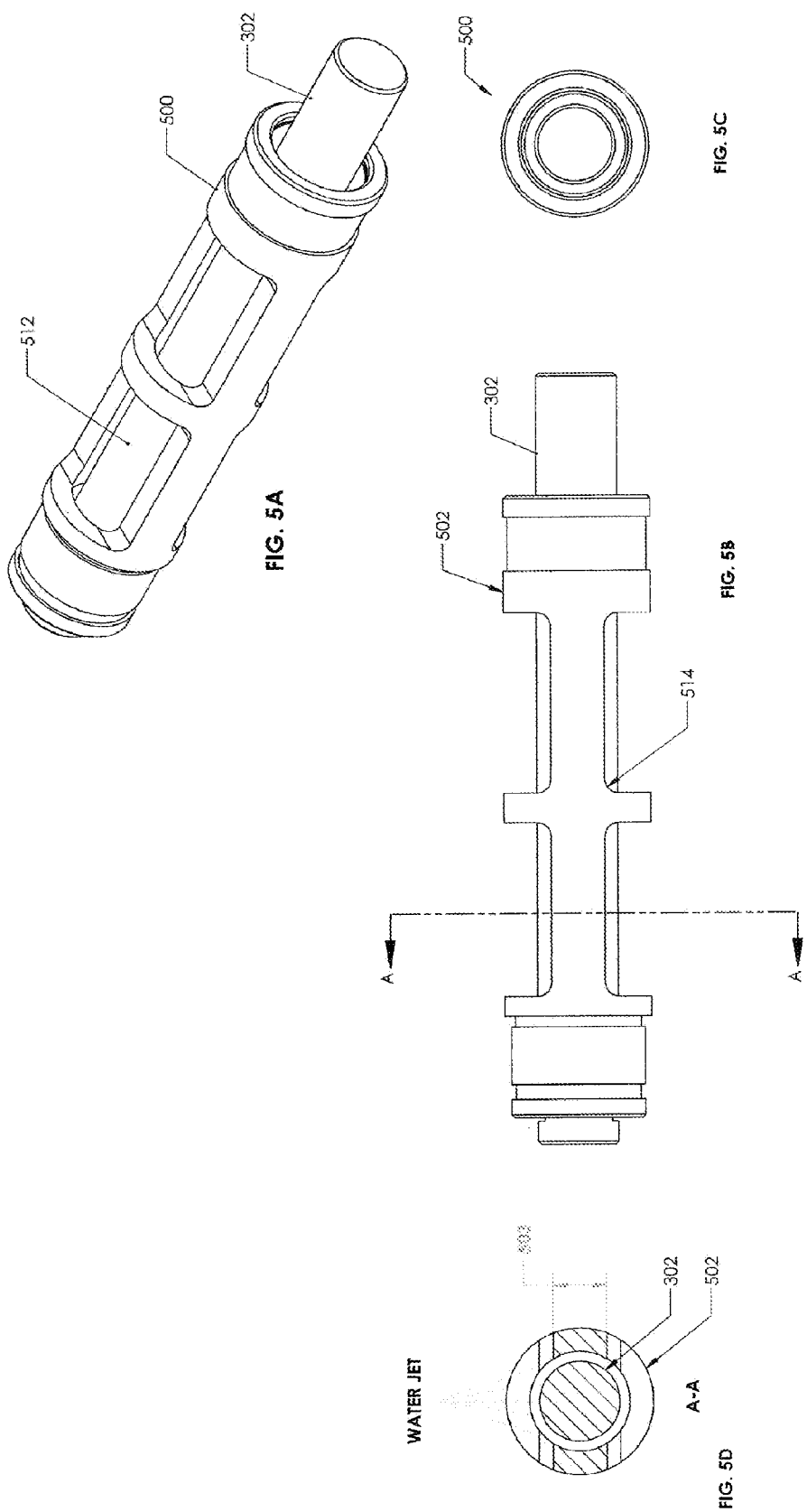

GUIDING ELEMENT FOR ACTUATOR

RELATED APPLICATIONS

This patent application claims the benefit of U.S. Provisional Application Ser. No. 62/024,606 filed Jul. 15, 2014, the content of which is incorporated by reference in its entirety.

FIELD OF THE INVENTION

The invention relates generally to bearing-guided actuators for washdown applications, and more specifically, to open frame washdown bearings for actuators.

BACKGROUND

Conventional actuators alone do not prevent the ingress of unwanted contaminants or the like from entering bearing packing areas, which can lead to microbial pathogen growth, oxidation of metallic surfaces, and/or the displacement of the lubricants in the bearing packing areas of the actuator. In an attempt to address this issue, conventional sanitary, hygienic, or washdown-capable actuators often utilize various rubber, fluoroelastomer, or metallic washdown scrapers, wipers, or seals as a method of preventing food products and liquids from entering into the bearing housing. The wipers and lip seals in traditional bearing housing assemblies contain greases and other lubricants in areas within the bearing housing where friction is likely to be present between sliding, rolling, or rotating elements of the actuator. Examples include internal piston and cylinder sliding elements of pneumatic and hydraulic cylinders to the outboard support and guide bearings and pillow block assemblies of guided actuators. In addition to retaining the lubricants in the housing or bearing packing area, conventional sealing mechanisms are intended to provide a barrier against the intrusion of water, chemicals, dust, debris, or contaminants. However, the sealing mechanisms are ineffective at preventing the ingress of undesirable contaminants, liquids, and solids from entering the bearing packing areas. For example, Food and Drug Administration (FDA) regulated sanitary and hygienic cleaning processes typical in a food production or food handling environment commonly require the application of high temperature, pressurized water jets, caustic cleansers, soaps, and acids. The infiltration of cleaning agents, degreasers, and the like to the packing area can displace the lubricants. Thus, many lubricants on elements of the actuator are not retained due to a lack of resistance to various cleaning agents, and may be flushed out by repeated wash-down procedures. The same degreasing agents approved or listed with the FDA or National Science Foundation (NSF) for food and beverage equipment applied with the intent to remove proteins and animal fats from food service equipment can be equally as effective in removing petroleum and the like based lubricants and greases from areas prone to high friction in actuators. Once an undesirable foreign substance enters the packing area, it can be difficult to remove without the complete disassembly, cleaning, and rebuilding of the assembly.

BRIEF SUMMARY

In one aspect, provided is a washdown bearing for an actuator, comprising: a housing; one or more irrigation channels in the housing constructed and arranged for receiving a cleaning product; first and second cylindrical plane bearings positioned at ends of the housing, each having a low-friction surface permitting the absence of an externally applied lubricant; and an opening extending along a longitudinal axis through the plane bearings and the housing for receiving a rotatable or translatable shaft element.

In another aspect, provided is a washdown bearing for an actuator, comprising: a housing having an annular wall surface extending in a longitudinal direction; a bore extending through an interior of the housing in the longitudinal direction; a plurality of irrigation channels in the housing extending through the annular wall surface of the housing to the bore that provide a fluid path between the wall surface to the bore; first and second cylindrical plane bearings positioned at ends of the housing, each having a low-friction surface permitting the absence of an externally applied lubricant; and an opening extending along a longitudinal axis through the plane bearings and the housing for receiving a rotatable or translatable shaft element.

In some embodiments, the housing is a single bearing housing. In other embodiments, the housing is a double bearing housing.

In some embodiments, the plane bearings comprise a solid lubricant composite material of the plane bearings, and is absent a supplemental lubricant.

In some embodiments, the irrigation channels extend through the annular wall surfaces of the housing to the bore extending longitudinally through the center of the housing, providing for an open-frame configuration.

In some embodiments, the irrigation channels include fillets at the corners of the irrigation channels, the fillets each having a radius that prevents an entrapment of contaminants.

In some embodiments, the irrigation channels allow for an effective 360 degree cleaning of portions of a sliding shaft element positioned in the bore of the housing.

In some embodiments, the irrigation channels are part of an open-frame configuration of the housing, and require no additional lubrication.

In some embodiments, the washdown bearing further comprises removable internal snap rings that provide positive reinforcement and retention of the plane bearings.

In some embodiments, the washdown bearing further comprises include an external snap ring that is retained in a snap ring groove in a journal of the housing.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 1B is a top view of the washdown bearing of FIG. 1A.

FIG. 1C is a view of the washdown bearing of FIGS. 1A and 1B, taken along section A-A of FIG. 1B.

FIG. 1D is a front view of the washdown bearing of FIGS. 1A-1C.

FIG. 1E is perspective view of the washdown bearing 10 of FIGS. 1A-1D, illustrating at least a portion of an interior of the washdown bearing 10, in accordance with some embodiments.

FIG. 3A is an exploded view of an actuator including the washdown bearing of FIGS. 1A-1C, in accordance with some embodiments.

FIG. 3B is another exploded view of the actuator of FIG. 3A, at least partially exposing an interior of the actuator.

FIG. 3C is an exploded side view of the actuator of FIGS. 3A and 3B, at least partially exposing an interior of the actuator.

FIG. 4B is a top view of the actuator of FIG. 4A.

FIG. 4C is a side view of the actuator of FIGS. 4A and 4B.

FIG. 5A is a perspective view of a washdown bearing for a long stroke actuator, in accordance with some embodiments.

FIG. 5B is a side view of the washdown bearing of FIG. 5A.

FIG. 5C is a front view of the washdown bearing of FIGS. 5A and 5B.

FIG. 5D is a view of the washdown bearing of FIGS. 5A-5C, taken along line A-A of FIG. 5B.

DETAILED DESCRIPTION

Figure 1A:
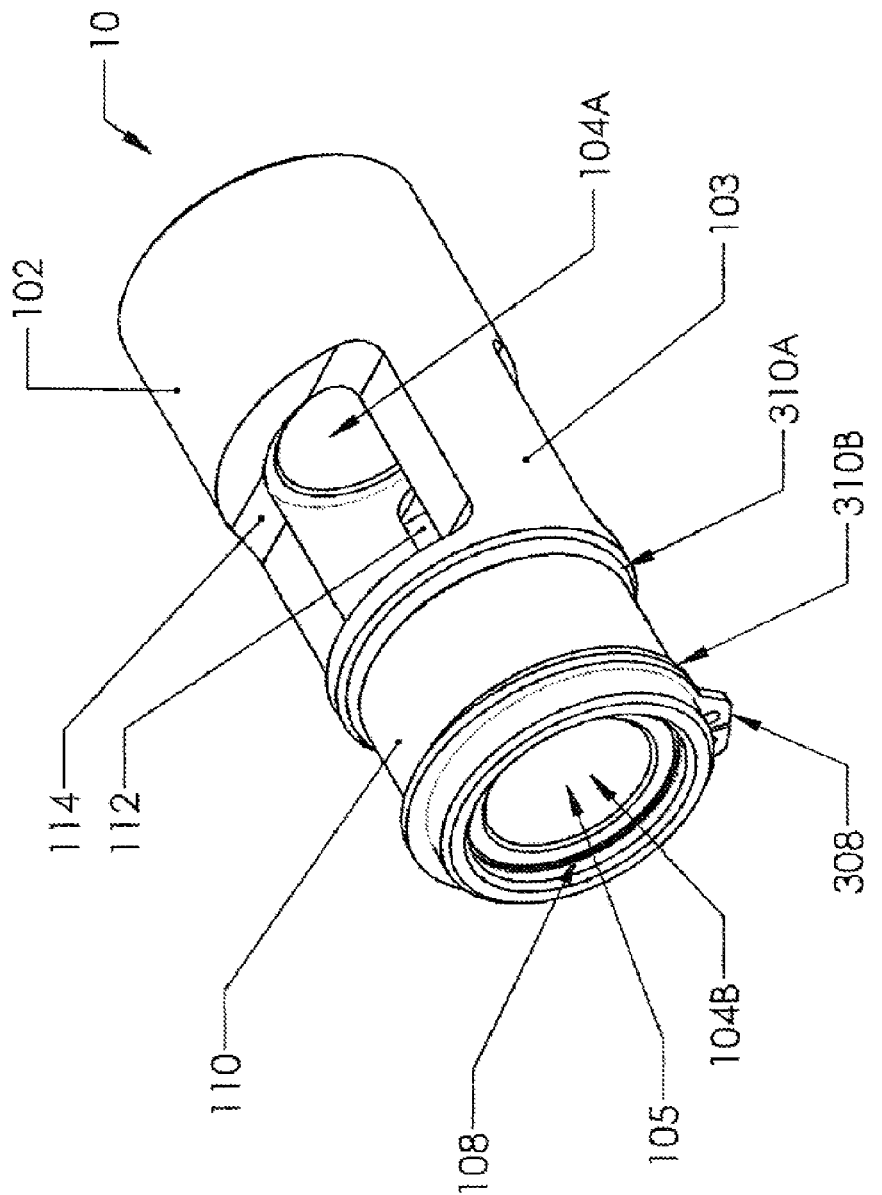
FIG. 1A is a perspective view of a washdown bearing for a short stroke actuator, in accordance with some embodiments.

FIG. 1A is a perspective view of a washdown bearing 10 for a short stroke actuator, in accordance with some embodiments. FIG. 1B is a top view of the washdown bearing 10 of FIG. 1A. FIG. 1C is a view of the washdown bearing 10 of FIGS. 1A and 1B, taken along section A-A of FIG. 1B. FIG. 1D is a side view of the washdown bearing 10 of FIGS. 1A-1C. FIG. 1E is perspective view of the washdown bearing 10 of FIGS. 1A-1D, illustrating at least a portion of an interior of the washdown bearing 10, in accordance with some embodiments.

The washdown bearing 10 can be constructed and arranged as a primary guiding element for a pneumatic, linear actuator or the like. Other actuators can equally apply, such as carriage style actuators, long-stroke actuators, conveyor stopper cylinders, grippers, rotary actuators, and other pneumatic components common in applications such as food packaging and other material handling equipment.

The washdown bearing 10 includes a pair of plane cylindrical bearings 104A, 104B (generally, 104) positioned at each end of a housing 102.

The housing 102 is preferably a solid machined one-piece unit that extends along in a longitudinal direction from a first end to a second end. The housing 102 can be machined from a single stock, such as round tubing, thereby reducing material removal and minimizing machining time. The housing 102 can be constructed and arranged for short stroke lengths ranging from about 25-150 mm. In other embodiments described herein, longer stroke lengths are supported that are at least 150 mm.

The housing 102 includes a cylindrical bore 105 extending through a central region from the first end of the housing 102 to the second end in the longitudinal direction. The cylindrical bearings 104A, B can be positioned in the bore 105 at the first and second ends of the housing 102, respectively. One or more openings, or irrigation channels 112, can extend through the annular wall surfaces of the housing 102 to the bore 105 extending longitudinally through the center of the housing 102, providing for an open-frame configuration.

The irrigation channels 112 are constructed and arranged to allow for complete irrigation and cleansing during a washdown process of the bearing surfaces, sliding shaft elements, internal shelves, cavities, and so on by way of cleaning heads, water jets, hoses, and brushes without disassembly. In particular, the irrigation channels 112 extend through the annular wall surface of the housing 102 to the bore 105 to form a fluid path from the wall surface to the bore 105, for example, to permit for the flow of cleaning agents, water, and so on from the exterior to the interior of the housing 102. The irrigation channels 112 allow for an effective 360 degree cleaning of portions of a sliding shaft element positioned in the bore of the housing 102, for example, using cleaning agents permitted for use in the protein and dairy packaging industries. As shown in FIGS. 1A-1C, two irrigation channels 112 are positioned on opposite sides of the housing 102. However, other configurations of the irrigation channels 112 equally apply, for example, four channels 112 equidistant from each other about a same circumference or perimeter of the housing.

The irrigation channels 112 are possible in the open-frame configuration of the housing 102 since there is no need for additional lubrication as with conventional closed bearing housings.

The irrigation channels 112 can be formed by partially removing exterior, perimeter wall surfaces of the housing 102, machined or otherwise formed approaching the axial center of the housing 102 at a suitable depth to provide maximum exposure of the internal surfaces while leaving a set of webs, fingers, or spokes 103 in the anterior wall of the housing 102 parallel to the internal bore of the housing 102 of a suitable cross-section to providing structural strength for connecting the features that support the bearings 104. For example, the fingers 103 extend between the plane cylindrical bearings 104A, 104B and maintain structural integrity from the first bearing 104A to the second bearing 104B.

The irrigation channels 112 can include fillets 114 at the corners of the irrigation channels 112, which have radii that prevent an entrapment of contaminants and allows ease of cleaning while providing additional strength to the shear point or intersection of the webs, fingers, or spokes 103 to the first and second end of the housing 102 supporting the cylindrical features of the plane bearing 10. Stress concentration is a problem of load-bearing mechanical parts which is reduced by employing fillets 114, chamfers, or the like on points and lines of expected high stress. The fillets 114 distribute the stress over a broader area and effectively make the parts more durable and capable of bearing larger loads. Since the fingers, spikes, web features or related structural elements 103 provide structural integrity of the housings first and second ends against axial and radial loads imposed on the plain bearings, the fillets 114 can contribute to this overall intent to maintain a fixed centerline or axis between the two plain bearings 104 for supporting the sliding or rotating element 302.

The openings forming the irrigation channels 112 in the open-frame configuration of the housing 102 are of a maximum area as possible without significantly sacrificing the structural integrity of the housing 102. In other words, whereas the partial removal of exterior walls of the housing 102 to form the openings 112 forming the irrigation channels does not significantly degrade the radial and axial load bearing capacity of the housing 102 or consequently of the plain bearings 104. Also, the large openings 112 translate to a reduction in weight of the assembly. In doing so, the internal surfaces of the housing 102, for example, the surface of the internal bore of the housing 102 extending along a longitudinal axis in a direction of the extension of the housing 102, are exposed to a cleaning apparatus or the like for removing undesirable material therefrom. The presence of the irrigation channels 112 also minimizes shelving and entrapment surfaces where contaminants or the like may otherwise accumulate, which may lead to microbial pathogen growth.

Figure 2C:
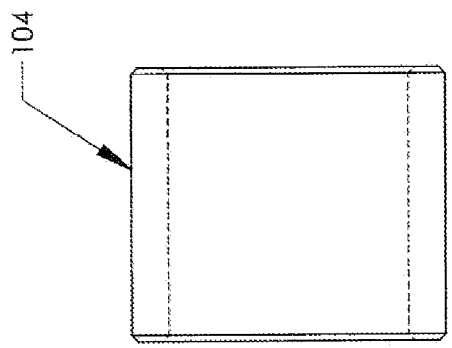
FIG. 2C is cross-sectional side view of the bearing of FIGS. 2A and 2B.
Figure 2B:
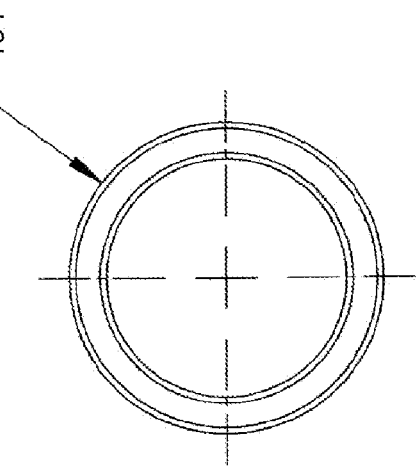
FIG. 2B is a front view of the bearing of FIG. 2A.
Figure 2A:
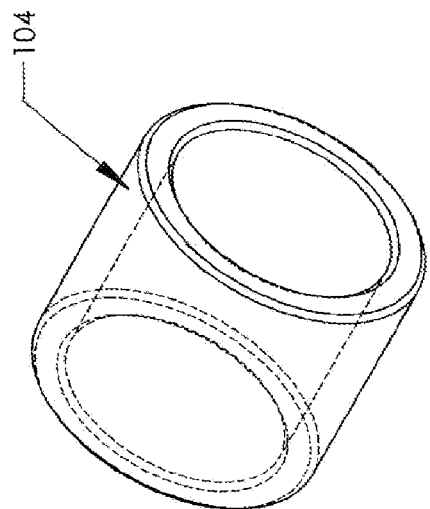
FIG. 2A is a perspective view of a bearing, in accordance with some embodiments.
Figure 4A:
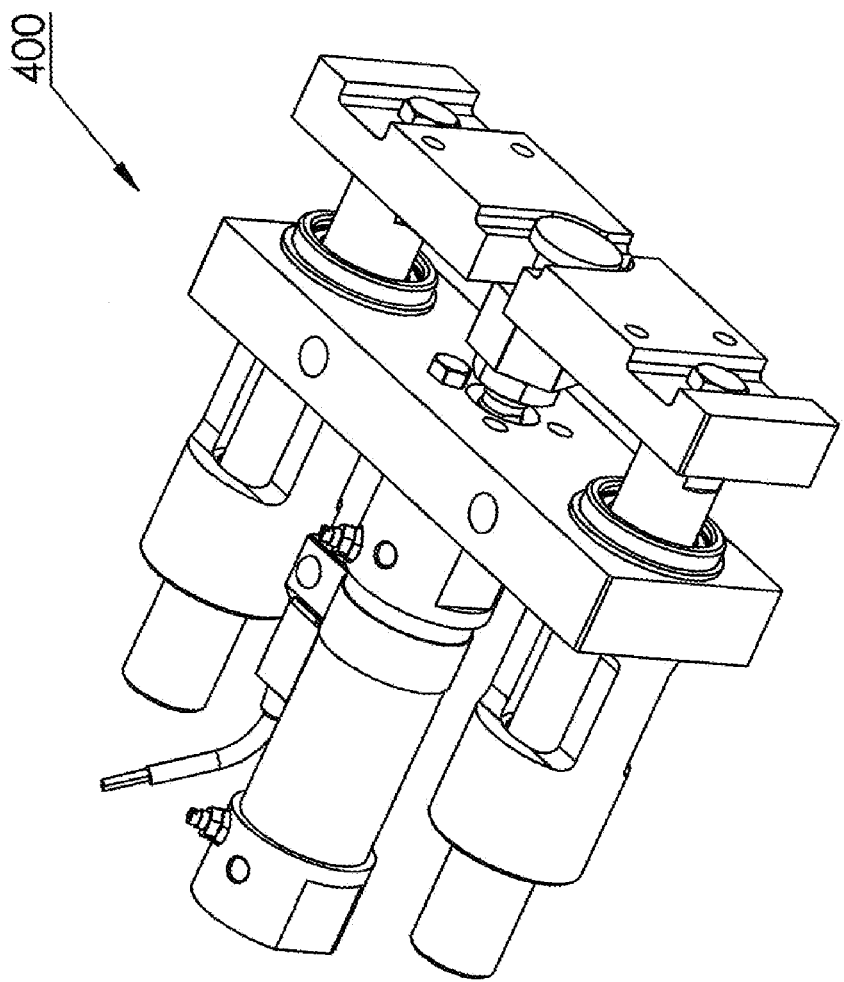
FIG. 4A is a perspective view of an actuator including the washdown bearing of FIGS. 1-3, in accordance with some embodiments.

Each plane bearing 104, for example, illustrated at FIGS. 2A-2C, can be formed of a solid lubricated material for engaging a translating, reciprocating, and/or rotating member such as a cylindrical sliding element 302 of FIGS. 3A-3C. For example, the plane bearing 104 can be formed of a metal, composite, polymer, alloy, or the like, or a combination thereof, having a low coefficient of friction, low wear rate, and dimensional stability, thereby permitting for use in salt sprays and/or caustic washdowns, and obviating the need for an additional or supplemental source of lubrication. Solid lubricants are materials which, despite being in the solid phase, are able to reduce friction between two surfaces sliding against each other without the need for a liquid medium. Examples can include but not be limited to PTFE, graphite, $MoS_2$ and some other anti friction and anti wear additives are often compounded in polymers and all kinds of sintered materials. $MoS_2$ for example is compounded in materials for sleeve bearings, elastomere O-rings, carbon brushes etc. Solid lubricants are compounded in plastics to form a "self-lubricating" or "internally lubricated" thermoplastic composite. PTFE particles for example compounded in the plastic form a PTFE film over the mating surface resulting in a reduction of friction and wear. $MoS_2$ compounded in nylon reduces wear, friction and stick-slip. Furthermore, it acts as a nucleating agent effecting in a very fine crystalline structure. Another example can include graphite lubricated thermoplastics.

The single-piece plane bearing 104 does not require supplemental lubrication, and therefore eliminates the need for wipers, scrapers, and seals, which are otherwise necessary to captivate additional or supplemental lubricants. In embodiments where the plane bearings 104 are formed of composites, the composite material can be approved by the U.S. Food and Drug Administration (FDA), for incidental contact with foods making it ideal for food processing and packaging environments. Other plane bearing materials can equally apply, depending on the application.

The solid lubricant composite material of the plane bearings 104 can have a low water absorption rate, allowing for close bearing bore fits on sliding shaft elements following a wash-down or exposure to liquids. The solid lubricant composite material of the plane bearings 104 can have an acceptable chemical resistance to sodium hydroxide or other caustic soda solutions typical in sanitary and hygienic wash-down applications. The solid lubricant composite material of the plane bearings 104 can maintain a high dimensional stability, allowing for close machining tolerance machining and a close fit for sliding to the shaft element extending therethrough, for example, shown in FIGS. 3A-3C. The solid lubricant composite material of the plane bearings 104 can be of a material selected for dimensional stability when exposed to high and/or low temperatures.

The bushings or related actuator components in accordance with some embodiments are made from an FDA approved material that requires no lubricants, permitting washdown applications to be performed that would otherwise remove lubricants. Accordingly, the materials forming the washdown bearing 10 are resistant to cleaning and sanitizing agents, especially those used in the protein and dairy packaging industries.

The internal snap rings 108A, B (generally, 108) can provide positive reinforcement and retention of the plane bearing 10 within the bearing housing 102 or pillow block housing (see FIG. 1). The snap rings 108 can be removed, and the plane bearings 104 can be extracted from the housing 102 for replacement or repair.

FIG. 3A is an exploded view of an actuator 300 including the washdown bearing 10 of FIGS. 1A-1C, in accordance with some embodiments. FIG. 3B is another exploded view of the actuator 300 of FIG. 3A, at least partially exposing an interior of the actuator 300. FIG. 3C is an exploded side view of the actuator 300 of FIGS. 3A and 3B, at least partially exposing an interior of the actuator 300.

The actuator 300 includes a sliding element 302 that extends through the bearing 10, and a bearing mount plate 304 coupled to the bearing 10. Sliding elements 302 can be turned, and ground, round or elliptical hardened steel shafting constructed and arranged for low friction reciprocating or rotational movement axially through the guiding element. A sliding element 302 constructed of stainless steel, for example, provides at least some corrosion or rust resistance suitable for washdown applications.

Figure 5E:
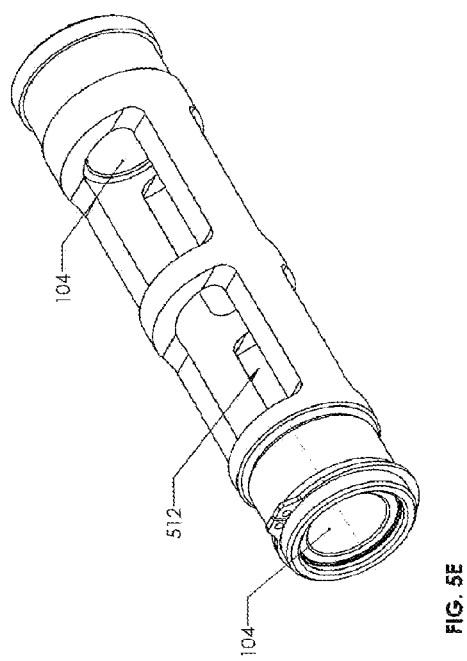
FIG. 5E is a perspective view of a washdown bearing for the long stroke actuator of FIGS. 5A-5D, at least partially exposing an interior, in accordance with some embodiments.
Figure 5G:
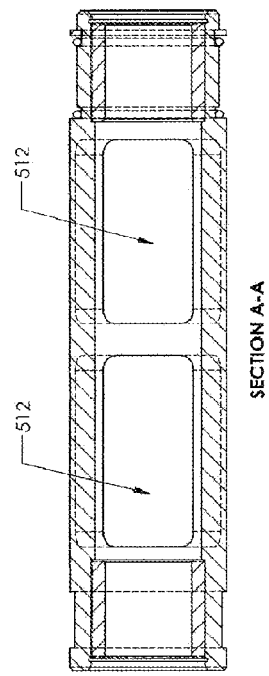
FIG. 5G is a view of the washdown bearing of FIGS. 5A-5F.
Figure 5F:
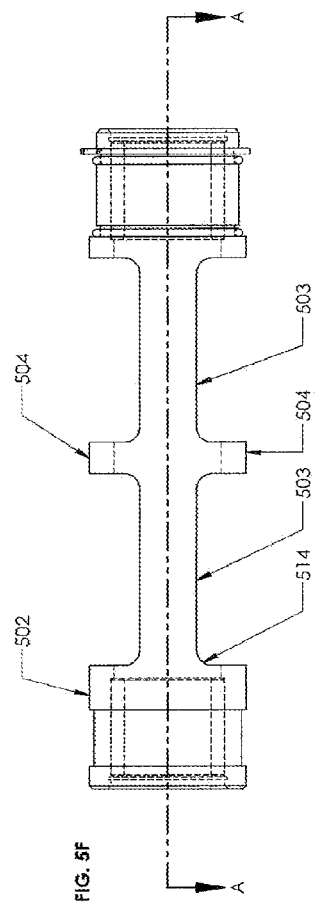
FIG. 5F is a top view of the washdown bearing of FIGS. 5A-5E.

The actuator 300 can include an external snap ring 308 that is retained in a snap ring groove 122 in the journal of the housing 102. The snap ring 308 can be formed of stainless steel or other corrosion-resistant material. The snap ring 308 allows for a 360 degree rotation of the bearing 10 about the axis of the sliding shaft element 302, allowing for exposure of the shaft element 302 to cleaning jets, for example, high pressure water jets shown in FIG. 5A, or hoses, brushes, or related cleaning devices.

The snap ring 308 allows for fast, easy removal of the bearing housing 102 from the actuator or the mount plate 304 for replacement or refurbishment. The bearing 10 can therefore be field replaceable, for example, by removing the snap ring 308, to minimize machine downtime due to worn or damaged bearings. The snap ring 308 also minimizes or prevents the possibility of loose fastener parts that may be misplaced or lost.

A pair of o-rings 310 can be seated in o-ring grooves 122 in the housing 102. The o-rings provide a static seal to prevent the egress of contaminants and fluids into the precision bore 306 of the mounting plate 304, or in other embodiments, a bearing plate of an actuator. The o-rings 310 can be formed of Fluoroelastomer material or related material approved by the FDA for incidental food contact, or of a material providing a suitable chemical resistance or a temperature rating of a given application.

The bearing 10 can therefore be constructed and arranged to be a modular, self-sustaining, load bearing, and guiding element for ground, round steel shafting, and can be applied to various linear or rotary actuation mechanisms providing the same primary benefits of the actuator described herein, across many industries and applications where corrosion and chemical resistance, lubrication free, and clean in place, service in place, and incidental exposure to food products may occur.

FIG. 5A is a perspective view of a washdown bearing 500 for a long stroke actuator, in accordance with some embodiments. FIG. 5B is a side view of the washdown bearing 500 of FIG. 5A. The washdown bearing 500 is similar to the washdown bearing 10, except that the washdown bearing 500 includes a double bearing housing 502.

A plurality of irrigation channels 512 can be formed by partially removing exterior, perimeter wall surfaces of the housing 502, machined or otherwise formed approaching the axial center of the housing 502 at a suitable depth to provide maximum exposure of the internal surfaces.

The double bearing housing 502 for long stroke actuators includes the housing length that is extended to increase the distance between the plain bearings 104 for increased moment loading capacity. There exists two sets of fingers, spokes, or webs 503 running parallel to the cylindrical bore running through the central region provided to allow for complete irrigation and cleansing during a washdown process of the bearing surfaces, sliding shaft elements, internal shelves, cavities, and so on by way of cleaning heads, water jets, hoses, and brushes without disassembly. The webs, fingers, or spokes 503 form boundaries of the irrigation channels 512 and provide structural integrity of the housing 502. The parallel running webs, fingers, or spokes 503 are connected to each other midway along the length of the bearing housing 502 by way of a set of webs, fingers, or spokes 504 oriented perpendicular to the cylindrical bore running through the central region. These webs, fingers, or spokes 504 provide additional material thickness in the centroid or midpoint area of the overall bearing housing at the point of the highest stress concentration when the plain bearings 104 are subjected to radial and or axial loads. The width of the perpendicular web, fingers, or spokes 504 running perpendicular are of a suitable cross sectional area to provide strength to the overall bearing housing 502 while minimizing additional shelving surfaces where contaminants can accumulate in the spirit of the open-frame concept.

As shown in FIG. 5D, the bearing housing 502 is rotatable about the sliding element 302 for cleaning via the irrigation channels 512.

Figure 6A:
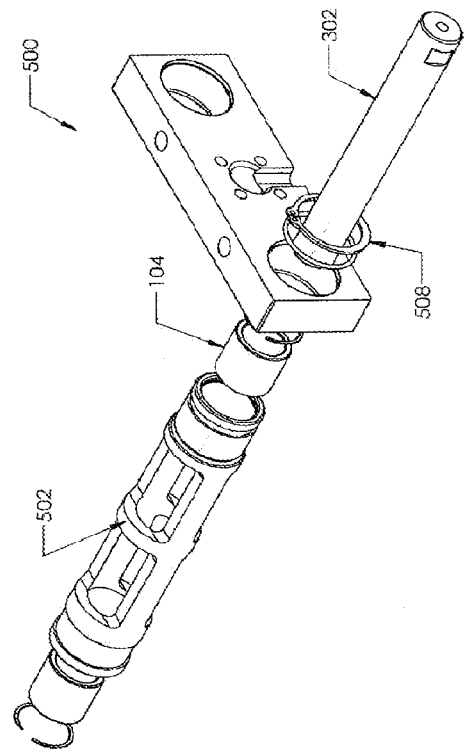
FIG. 6A is an exploded view of an actuator including the washdown bearing of FIGS. 5A-5G, in accordance with some embodiments.
Figure 6B:
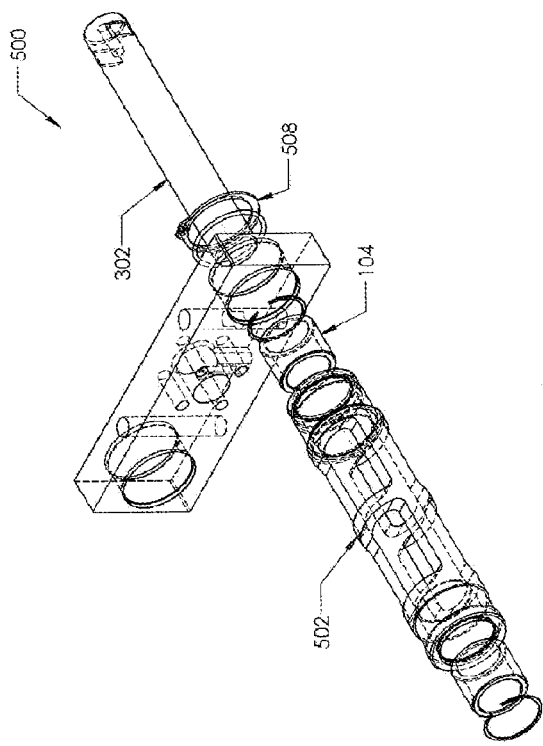
FIG. 6B is another exploded view of the actuator of FIGS. 5A-5G and 6A, at least partially exposing an interior of the actuator.
Figure 6C:
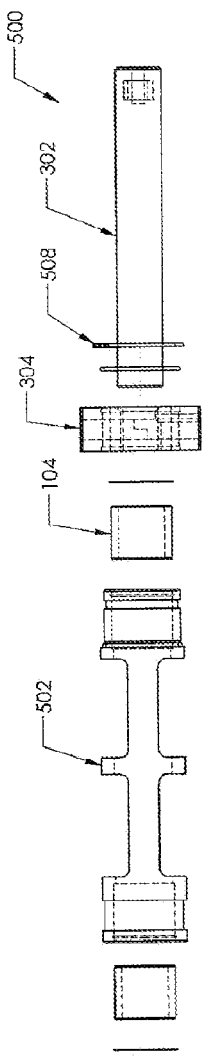
FIG. 6C is an exploded side view of the actuator of FIGS. 6A and 6B, at least partially exposing an interior of the actuator.

FIG. 6A is an exploded view of an actuator 500 including the washdown bearing of FIGS. 5A-5G, in accordance with some embodiments. FIG. 6B is another exploded view of the actuator of FIGS. 5A-5G and 6A, at least partially exposing an interior of the actuator. FIG. 6C is an exploded side view of the actuator of FIGS. 6A and 6B, at least partially exposing an interior of the actuator. Elements such as bearing housing 502, spokes 504, bearings 104, shaft elements 302, o-rings, snap rings 508, fillets 514, and/or mounting plate 304 are the same as or similar to those described in embodiments of FIGS. 1-4. Details thereof are not repeated for brevity.

The foregoing is illustrative of example embodiments and is not to be construed as limiting thereof. Although a few example embodiments have been described, including for example drawings with dimensions, those skilled in the art will readily appreciate that many modifications are possible in the example embodiments without materially departing from the novel teachings and advantages of the present inventive concept. It is to be understood that the foregoing is illustrative of various example embodiments and is not to be construed as limited to the specific example embodiments disclosed, and that modifications to the disclosed example embodiments, as well as other example embodiments, are intended to be included within the scope of the claims.

The invention claimed is:

1. A washdown bearing for an actuator, comprising:
   a housing having an annular wall surface extending in a longitudinal direction;
   a bore extending through an interior of the housing in the longitudinal direction;
   a plurality of irrigation channels in the housing extending through the annular wall surface of the housing to the bore that provide a fluid path between the wall surface to the bore;
   first and second cylindrical plane bearings positioned at ends of the housing, each having a low-friction surface permitting the absence of an externally applied lubricant; and
   an opening extending along a longitudinal axis through the plane bearings and the housing for receiving a rotatable or translatable shaft element.

2. The washdown bearing of claim 1, wherein the housing is a single bearing housing.

3. The washdown bearing of claim 1, the housing is a double bearing housing.

4. The washdown bearing of claim 1, wherein the plane bearings comprise a solid lubricant composite material of the plane bearings, and is absent a supplemental lubricant.

5. The washdown bearing of claim 1, wherein the irrigation channels extend through the annular wall surfaces of the housing to the bore extending longitudinally through the center of the housing, providing for an open-frame configuration.

6. The washdown bearing of claim 1, wherein the irrigation channels include fillets at the corners of the irrigation channels, the fillets each having a radius that prevents an entrapment of contaminants.

7. The washdown bearing of claim 1, wherein the irrigation channels allow for an effective 360 degree cleaning of portions of a sliding shaft element positioned in the bore of the housing.

8. The washdown bearing of claim 1, wherein the irrigation channels are part of an open-frame configuration of the housing, and require no additional lubrication.

9. The washdown bearing of claim 1, further comprising removable internal snap rings that provide positive reinforcement and retention of the plane bearings.

10. The washdown bearing of claim 9 can include an external snap ring that is retained in a snap ring groove in a journal of the housing.

* * * * *